US006793952B2

(12) United States Patent
Fenn et al.

(10) Patent No.: US 6,793,952 B2
(45) Date of Patent: Sep. 21, 2004

(54) FROZEN FOOD PRODUCT

(75) Inventors: Richard Anthony Fenn, Colworth (GB); David Needham, Colworth (GB); Keith Smallwood, Colworth (GB)

(73) Assignee: Good Humor-Breyers Ice Cream, division of Conopco, Inc., Green Bay, WI (US)

( * ) Notice: Subject to any disclaimer, the term of this patent is extended or adjusted under 35 U.S.C. 154(b) by 0 days.

(21) Appl. No.: 08/890,490

(22) Filed: Jul. 9, 1997

(65) Prior Publication Data

US 2001/0048962 A1 Dec. 6, 2001

(30) Foreign Application Priority Data

Jul. 26, 1996 (EP) ............................................. 96305498

(51) Int. Cl.[7] ................................................. A23G 9/00
(52) U.S. Cl. ........................ 426/565; 426/656; 426/660
(58) Field of Search ................................ 426/565, 656, 426/660, 100, 101, 99, 104, 36, 34, 42, 139

(56) References Cited

U.S. PATENT DOCUMENTS

| | | | |
|---|---|---|---|
| 3,897,571 A | | 7/1975 | Hamler et al. ............... 426/327 |
| 4,476,248 A | * | 10/1984 | Gordon et al. ............... 562/494 |
| 4,500,553 A | | 2/1985 | Liggett et al. ............... 426/101 |
| 4,565,643 A | | 1/1986 | Arai et al. .................... 252/70 |
| 4,710,231 A | * | 12/1987 | Bateman et al. ............... 127/30 |
| 5,118,792 A | * | 6/1992 | Warren et al. ............... 530/350 |
| 5,194,269 A | * | 3/1993 | Lee .............................. 426/61 |
| 5,215,777 A | * | 6/1993 | Asher et al. ................. 426/565 |
| 5,620,732 A | * | 4/1997 | Clemmings et al. ......... 426/565 |
| 5,676,985 A | * | 10/1997 | Fletcher et al. ............... 426/36 |
| 5,849,383 A | * | 12/1998 | Nordhauser et al. ......... 424/489 |
| 5,849,537 A | * | 12/1998 | Tripp et al. ................ 435/69.7 |
| 5,852,172 A | * | 12/1998 | Griffith ....................... 530/379 |
| 6,090,917 A | * | 7/2000 | Lillford et al. |
| 6,096,867 A | * | 8/2000 | Byass et al. |
| 6,156,880 A | * | 12/2000 | Lillford et al. |
| 6,162,789 A | * | 12/2000 | Lillford et al. |
| 6,174,550 B1 | * | 1/2001 | Fletcher et al. |
| 6,200,622 B1 | * | 3/2001 | Darling et al. ............... 426/565 |

FOREIGN PATENT DOCUMENTS

| | | |
|---|---|---|
| EP | A O 0 037 205 | 10/1981 |
| EP | 0037-205 | 10/1981 |
| GB | 2075326 | 11/1981 |
| GB | A-2 075 326 | 11/1991 |
| GB | 2 315 662 | * 2/1998 |
| HU | 9802321 | 3/1999 |
| WO | 90/13571 | 11/1990 |
| WO | 91/10361 | 7/1991 |
| WO | 91/12718 | 9/1991 |
| WO | 92/22581 | 12/1992 |
| WO | 94/03617 | 2/1994 |
| WO | 95-20883 | 8/1995 |
| WO | 95/20883 | 8/1995 |
| WO | 96/11586 | 4/1996 |
| WO | 96-16557 | 6/1996 |
| WO | A-96 16557 | 6/1996 |
| WO | 96/20695 | 7/1996 |
| WO | 96/40973 | 12/1996 |
| WO | 97/2343 | 1/1997 |

OTHER PUBLICATIONS

Arbuckle, "Ice Cream", 3$^{rd}$ ed. pp. 246, 323–330, 1977.*
Perry's Chemical Engineer's Handbook, 6$^{th}$ ed., pp. 8–6–8–7, 1984.*
German Search Report dated Oct. 29, 1997.
Republic of France Search Report dated Apr. 1, 1998.
European Search Report dated Sep. 23, 1997.
Hungarian Novelty Search Report on Application No. P9903173 dated Feb. 14, 2001.
Gov't of India Search Report.
Co–pending application for Chapman et al., Ser. No. 08/673, 876; Filed Jul. 2, 1996 for Recominant Peptide.
Marilyn Griffith and K. Vanya Ewart in "Biotechnology Advances," vol. 13, No. 3, pp. 375–402, 1995.
John G. Duman, Cryobiology30, pp. 322–328, 1993.
Lee et al., abstract R228.
A copy of the European Search Report in European Patent Application EP 96/305498.
Robert E. Feeney et al., "Food Technology," Jan. 1993. No. 1, pp. 84 & 87.
W.S. Arbuckle, "Ice Cream," 4th Edition, 1987, XP002022180,pp 232, pp 238.
Patent Abstracts of Japan, vol. 8, No. 537 (C–1260), Oct. 13, 1994 and JP–A–06 189686 (Sato Norio et al.), Jul. 12, 1994. (abstract).
Copy of the PCT International Search Report in the PCT Patent ApplicationPCT/EP/97/03636.
P.J. Lillford et al., "Antifreeze Proteins," Journal of Food Engineering, vol. 22, 1994, Great Britain, pp. 475–482, XP002047525, pp. 480, line 30 and 38.
Patent Abstracts of Japan, vol. 8, No. 537 (C–1260), Oct. 13, 1994 and JP–A–06 189686 (Sato Norio et al.), Jul. 12, 1994. (abstract).

* cited by examiner

Primary Examiner—N. Bhat
(74) Attorney, Agent, or Firm—Gerard J. McGowan, Jr.

(57) ABSTRACT

A process for the production of a frozen food product comprising Anti-freeze peptides, wherein the conditions are chosen such that the ice-crystals in the product have an aspect ratio of from 1.9 to 3.

12 Claims, No Drawings

FROZEN FOOD PRODUCT

TECHNICAL FIELD OF THE INVENTION

The invention relates to a process for the preparation of a food product containing AFPs and to food products containing AFPs.

BACKGROUND OF THE INVENTION

Anti-freeze peptides (AFPs) have been suggested for improving the freezing tolerance of foodstuffs.

Antifreeze proteins have been described in the literature, see for example Marilyn Griffith and K. Vanya Ewart in Biotechnology Advances, Vol 13, No 3, pp 375–402, 1995.

Antifreeze properties generally possess one or more of the following properties: thermal hysteresis, inhibition of ice recrystallisation, control of ice crystal shape and interaction with ice nucleators.

Thermal hysteresis is the best known property of AFP's and the property is normally used to test for the presence of AFP's. Thermal hysteresis results from a lowering of the apparent freezing temperature of a solution containing a thermal hysteresis active AFP without affecting the melting temperature. The identification of sources of AFP by thermal hysteresis tests is widely described in the literature, see for example John G Duman in Cryobiology 30, 322–328 (1993).

Inhibition of ice recrystallisation is another property of AFPs. This activity is also referred to as ice crystal growth suppression. This property can be tested by comparing at a certain point in time the ice crystal size of crystals in the presence of AFP and in the absence of AFP. The application of this method in the testing of fish AFPs is described in U.S. Pat. No. 5,118,792 (DNA Plant Technology Corporation)

A third property of AFPs is their ability to influence the shape of ice crystals. This property stems from the selective binding of AFPs to certain faces of the ice crystal and therewith limiting crystal growth in certain directions. The presence of ice crystals having an hexagonal bipyramid shape is then considered indicative of the presence of AFP. This method is for example described for testing the activity of extracellular winter rye AFPs in WO 92/22581 (University of Waterloo).

A fourth property of AFPs is their ability to inhibit the activity of ice nucleating substances. This interaction between and AFP and an ice nucleator may for example result in increased thermal hysteresis. This property is for example tested in WO 96/40973 (University of Notre dame du Lac)

AFPs have been suggested for improving the freezing tolerance of products. Many applications have been suggested in this context.

For example AFPs have been suggested for enhancing the cryopreservation of biological materials (WO 91/12718, Agouron Pharmaceuticals, WO 91/10361, The Regents of the University of California). Also AFPs have been suggested to prevent leakage from liposomes e.g. in cosmetic or pharmaceuticals (see WO 96/20695). A further possible application is to increase the freezing tolerance of plants by including therein (or transgenetically producing therein) an AFP (See J. Cell. Biochem. Suppl. vol. 14e, 1990, page 303 XP002030248, Lee et al, abstract R228). Also fish AFPs have been suggested for use in food products for example in frozen yoghurt or ice cream (U.S. Pat. No. 5,620,732 Pillsbury and WO 96/11586, HSC Research and development limited partnership).

Up till now, however the use of AFPs has not been applied on a commercial scale. Applicants are of the opinion that one of the reasons for the lack of commercial implementation is that although many AFPs have been described, in practice the implementation in actual commercial products encounters serious problems.

Applicants have found that one of the key reasons for these problems is that out of the great number of AFPs that have been described in the literature only a limited set of AFPs can suitably be applied for each application; also applicants have found that this selection of suitable AFPs is dependent on the desired application and/or product attributes to be achieved.

WO 90/13571 discloses antifreeze peptides produced chemically or by recombinant DNA techniques. The AFPs can suitably be used in food-products such as ice-cream. Example 3B shows modified ice-crystal shapes if a water-ice mixture is frozen into a film in combination with 0.01 wt % of AFP.

WO 92/22581 discloses AFPs from plants. This document also describes a process for extracting a polypeptide composition from extracellular spaces of plants by infiltrating leaves with an extraction medium without rupturing the plant cells.

WO 94/03617 discloses the production of AFPs from yeast and their possible use in ice-cream. WO 96/11586 describes fish AFPs produced by microbes.

The present invention aims at providing frozen food products having a relatively hard and brittle texture, said texture being maintained upon prolonged storage at low temperatures.

A number of literature places have suggested that AFPs may potentially be used for favourably influencing the textural properties of frozen confectionery products such as ice cream. However most of these documents do not provide a teaching how these favourable properties can actually be achieved in practice.

WO 96/11586 (not pre-published) teaches the application of fish antifreeze polypeptides in frozen fermented food products. Hard and brittle products are not mentioned.

WO 96/39878 (not pre-published) describes the application of AFP in ice-cream by using a specific freezing process. Suitable AFPs for this application may be derived from blood and muscle tissue of antartic fish, artic fish, worms and insects. Again hard and brittle products are not mentioned. Surprisingly it has been found that AFPs can conveniently be incorporated in frozen food products to result in the desired product properties as long as the product and processing conditions are varied such that the ice-crystal shape satisfies specific requirements.

Accordingly in a first aspect, the invention relates to a process for the production of a frozen food product comprising AFP, wherein the conditions are chosen such that the ice-crystals in the product have an aspect ratio of more than 1.9, preferably from 1.9 to 3.0.

If food products are frozen, ice-crystals are formed throughout the product. If AFPs are included in food products to be frozen this generally may lead to a favourable change in ice-recrystallisation properties. Aggregation of the ice-crystals of AFP containing products may cause the brittleness of the product.

Many consumers are in favour of relatively hard and brittle frozen food products or ingredients thereof such as ice-cream or water-ice. For example crispy water-ice can be used as an attractive ingredient in frozen confectionery products, also relatively hard ice-cream is liked by a large group or consumers.

Surprisingly we have found that AFPs offer the opportunity to formulate frozen food products which on the one hand are relatively hard and brittle and on the other hand have improved ice-recrystallisation inhibition properties. Applicants have found that surprisingly this advantageous combination of properties can be achieved if the aspect ratio of the ice-crystals in the product is above 1.9, preferably between 1.9 and 3.

The aspect ratio of ice-crystals is defined as the ratio of the length and the breadth of the ice-crystals. An aspect ratio of above, preferably between 1.9 and 3 corresponds to elongated ice-crystals, which are not rounded in shape. The aspect ratio of crystals can be determined by any suitable method. A preferred method is illustrated in the examples. Preferably the ratio is between 2.0 and 2.9, most preferred between 2.1 and 2.8.

Preferably the frozen product of the invention are brittle. Preferably the minimum layer thickness at which fracture behaviour can be observed is less than 10 mm, more preferred from 1 to 5 mm. Fracture behaviour can either be measured by preparing layers of varying thickness and determining at which minimum thickness fracture behaviour occurs or calculated from the Young's Modulus as described in the examples.

During the formulation and subsequent freezing of food products several parameters can influence the aspect ratio of the ice-crystals to be formed. Examples of factors influencing the aspect ratio are given below. Applicants believe that it is well within the ability of the skilled person to choose those conditions such that the aspect ratio of the ice-crystals falls within the desired range.

One factor influencing the aspect ratio of ice-crystals is the rate of freezing the product. Generally speaking an increase of the rate of freezing leads to a decrease in the aspect ratio for the ice-crystals. In this context the temperature of freezing may influence the rate of freezing and therewith the aspect ration of the ice crystals. In this context freezing processes including a hardening step e.g. at a temperature below −30 Fahrenheit are sometimes preferred. The storage temperature and storage time may equally influence the aspect ratio, whereby higher storage temperatures and/or longer storage times tend to favour the formation of high aspect ratios.

Another factor influencing the aspect ratio of ice-crystals is the mobility of the product during freezing. For example if a liquid water-ice or ice-cream mix is to be frozen, quiescently freezing will lead to a fairly high aspect ratio for the ice-crystals, while stirring leads to a lower aspect ratio. High shear mixing will lead to even lower aspect ratios.

Another factor to influence the aspect ratio of the ice crystals is the presence and amounts of ingredients. For example the presence of ingredients which tend to form a network structure in the product (e.g. gums or fats) may lead to a lower aspect ratio than the in products without these ingredients. Also other ingredients may lead to lower aspect ratios, for example high solids levels e.g. high sugar levels may lead to low aspect ratios.

Finally the nature and amount of the AFPs present may lead to a change in aspect ratios. Some AFPs seem to favour the formation of low aspect ratios, while other AFPs seem to induce higher aspect ratios. A suitable test to select these AFPs is described in the examples. Variation in the amount of AFPs may also lead to a change in aspect ratios.

According to a second embodiment, the invention relates to a process for the production of a frozen food product comprising AFP, wherein the formulation, freezing and storage conditions are chosen such that the ice-crystals in the product have an aspect ratio of from 1.9 to 3.

The process of the invention can be applied to any frozen food product containing AFPs. Examples of suitable products are sauces, meals etc. Preferred food products are frozen confectionery products such as ice-cream and water-ice.

Applicants have found that the AFPs for use in the process of the invention can come from a variety of sources such as plants, fishes, insects and microorganisms. Both natural occurring species may be used or species which have been obtained through genetic modification. For example microorganisms or plants may be genetically modified to express AFPs and the AFPs may then be used in accordance to the present invention.

Genetic manipulation techniques may be used to produce AFPs as follows: An appropriate host cell or organism would be transformed by a gene construct that contains the desired polypeptide. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be utilised to express the polypeptide coding sequence. These include, but are not limited to, bacteria, yeast insect cell systems, plant cell culture systems and plants all transformed with the appropriate expression vectors.

A wide variety of plants and plant cell systems can be transformed with the nucleic acid constructs of the desired polypeptides. Preferred embodiments would include, but are not limited to, maize, tomato, tobacco, carrots, strawberries, rape seed and sugar beet.

For the purpose of the invention preferred AFPs are derived from fish (i.e. they are either directly obtained from fish, or the fish proteins a transgenetically produced by other organisms). Especially preferred is the use of fish proteins of the type III, most preferred HPLC 12 as described in our non-prepublished case PCT/EP96/02936 (WO 97/2343).

For some natural sources the AFPs may consist of a mixture of two or more different AFPs.

Preferably those AFPs are chosen which have significant ice-recrystallisation inhibition properties. Preferably AFPs in accordance to the invention provide an ice particle size upon recrystallisation—preferably measured in accordance to the examples—of less than 20 $\mu$m, more preferred from 5 to 15 $\mu$m. It is believed that the small ice-crystal size combined with the specific aspect ratio is especially advantageous to obtain the desirable structural features.

A very advantageous embodiment of the invention relates to product formulations which are chosen such that in the preparation of the product quiescent freezing conditions can be used, while still obtaining the aspect ratio as defined above.

Examples of such food products are: frozen confectionery mixes such as ice-cream mixes and water-ice mixes which are intended to be stored at ambient or refrigerator temperature. Suitable product forms are for example: a powder mix which is packed for example in a bag or in sachets. Said mix being capable of forming the basis of the frozen food product e.g. after addition of water and optionally other ingredients and—optional—aeration.

Another example of a suitable mix could be a liquid mix (optionally aerated) which, if necessary after addition of further components and optional further aeration can be frozen.

The clear advantage of the above mentioned mixes is that the presence of the AFP ingredient enables the mixes to be frozen under quiescent conditions, for example in a shop or home freezer.

Very conveniently these mixes are packed in closed containers (e.g. cartons, bags, boxes, plastic containers etc). For single portions the pack size will generally be from 10 to 1000 g. For multiple portions pack sizes of up to 500 kg may be suitable. Generally the pack size will be from 10 g to 5000 g.

As indicated above the preferred products wherein the AFPs are used are frozen confectionery product such as ice-cream or water-ice. Preferably the level of AFPs is from 0.0001 to 0.5 wt % based on the final product. If dry-mixes or concentrates are used, the concentration may be higher in order to ensure that the level in the final frozen product is within the above ranges.

Surprisingly it has been found that compositions of the invention can contain very low amounts of AFPs while still being of good quality.

Up till now the general belief has been that fairly high levels of AFPs are required to obtain a reasonable improvement of recrystallisation properties. The reason for this is that it is commonly believed that the AFPs act on significant parts of the surface of the ice-crystals and therefore need to be present at fairly high levels e.g. 0.01 wt % or more to get a reasonable effect.

Surprisingly it has now also been found that for frozen products improved recrystallisation properties and increased temperature tolerance can already be obtained if low levels of AFPs are used.

Surprisingly it has been found that the level of AFPs can be as low as 0.1 to 50 ppm while still providing adequate recrystallisation properties and temperature tolerance in frozen confectionery products. Although applicants do by no means wish to be bound by any theory, the reason for this may be that the interaction between the solids of the frozen confectionery and the AFPs provides an excellent mechanism for inhibiting crystal growth. Most conveniently the level of AFP is from 1 to 40 ppm, especially preferred from 2 to 10 ppm.

For the purpose of the invention the term frozen confectionery product includes milk containing frozen confections such as ice-cream, frozen yoghurt, sherbet, sorbet, ice milk and frozen custard, water-ices, granitas and frozen fruit purees. For some applications the use of AFPs in frozen fermented food products is less preferred.

Preferably the level of solids in the frozen confection (e.g. sugar, fat, flavouring etc) is more than 4 wt %, prefably more than 30 wt %, more preferred from 40 to 70 wt %.

In a very preferred embodiment of the invention the hard and crispy frozen confectionery formulations are used to create texture contrast in ice confections. Preferably such ice-confections contain as discrete elements in their structure the AFP containing composition in accordance to the invention. For example a relatively soft ice-cream core can be coated with a thin layer of the composition of the invention therewith providing a relatively hard and crispy layer surrounding the ice-cream core. Another embodiment could be the incorporation of the formulation of the invention as inclusions in ice-confections. A third embodiment would be the alternating of layers of ice-cream with the formulation of the invention to create thin crispy layers alternating with the ice-cream layers.

EXAMPLE I

A pre-mix for preparing ice-cream was made by mixing:

| Ingredient | % by weight |
| --- | --- |
| Skimmed milk powder | 10.00 |
| sucrose | 13.00 |
| maltodextrine (MD40) | 4.00 |
| Locust bean gum | 0.14 |
| butteroil | 8.00 |
| monoglyceride (palmitate) | 0.30 |
| vanillin | 0.01 |
| AFP (Type III HPLC-12, see WO 97/2343) | 0.01 or none (control) |
| water | balance |

This mix can conveniently be stored at ambient temperature e.g. in a plastic container.

The mixes can be used in the preparation of a ice-cream by homogenisation at 2000 psi and 65° C. followed by ageing over night at 5° C. The mix was frozen using a freezer (MF50 SSHE Technohoy fitted with a solid dasher rotating 240 rpm) The extrusion temperature was −4.5° C. the overrun was 110%. The product is then frozen at −35° C. and stored at −80° C.

After two months storage the composition according to the invention had a markedly better texture than the control sample.

EXAMPLE II

An ice-cream was prepared of the following formulation:

| Ingredient | % by weight |
| --- | --- |
| Skimmed milk powder | 10.00 |
| sucrose | 13.00 |
| maltodextrine (MD40) | 4.00 |
| Locust bean gum | 0.14 |
| butteroil | 8.00 |
| monoglyceride (palmitate) | 0.30 |
| vanillin | 0.01 |
| AFP (Type III HPLC-12) | 0.01 or none (control) |
| water | balance |

The method of preparation was as in example I.

Samples of both products were equilibrated at −18° C. in a Prolan environmental cabinet for approximately 12 hours. Microscopic slides were prepared by smearing a thin layer of ice-cream from the centre of thin glass plates.

Each slide was transferred to a temperature controlled microscopic stage (at −18° C.) where images of ice-crystals (about 400 individual ice-crystals) were collected and relayed through a video camera to an image storage and analysis system.

The stored ice crystal images were highlighted manually by drawing around its perimeter which then highlights the whole crystal. Images of the highlighted crystals were then measured using the image analysis software which counts the number of pixels required to complete the longest straight line (length), shortest straight line (breadth), the aspect ratio (length/breadth).

The average aspect ratio for the crystals was calculated. For the control sample the aspect ratio was 1.45 For the sample containing AFP the aspect ratio was 2.24.

EXAMPLE III

The brittleness of the ice-cream of example II was determined by calculations on the fracture behaviour of the ice-cream. Using a 3-Point bend test the Young's Modulus was measured.

The Young's modulus was measured by preparing strips of ice-cream, equilibrating them for 18 hours in a freezer cabinet and transferring to a temperature cabinet. The strips were placed on a 3-point bend rig as described in *Handbook of Plastics Test Methods* (2nd Edition), ed R. P. Brown, George Godwin Ltd, 1981. Sample testing was carried out immediately at a deformation speed of 50 mm/min. From the force-deformation curve, the initial slope was measured and used to calculate the Young's modulus according to the following equation:

$$\text{Young Modulus (Pa)} = \frac{\text{Slope} \cdot L^3}{4 \cdot B \cdot W^3}$$

where L=beam span (110 mm), B=sample width, W=sample height. Usually eight samples were tested to give a mean Young's Modulus value.

Using the calculations described by Williams & Cawood in Polymer Testing 9 15–26 (1990) the fracture toughness can be calculated.

The results were as follows: For the control sample a thickness of 966 metres was calculated as being necessary to obtain a brittle layer. For the AFP containing sample brittleness (fracture behaviour) was already found at a thickness of 3 mm. This clearly shows the improved brittleness of products of the invention. Both samples gave relatively soft products.

EXAMPLE IV

This example describes a methodology to select those AFPs which favour the formation of ice crystal shapes as preferred in the invention.

Ice crystal growth under normal circumstances is along the a-axis of the crystal. If AFPs are present the growth is changed. This selective influencing of the crystal shape can be explained by the fact that AFPs tend to bind to certain parts of the ice crystal and by doing this inhibit the growth of the ice-crystal in certain directions. Binding can for example take place at the prism planes (perpendicular to the a-axis) or at the Pyramidal planes (projecting off these planes).

Applicants have found that AFPs which favour the formation of aspect ratios in accordance to the present invention can for example be found by selecting those AFPs which tend to bind on the prism plane. The methodology for selecting these specifically binding AFPs can be any suitable methodology. A suitable test uses the so-called "Single ice crystal 'hemisphere' growth experiment, based on the technique described in Knight C. A., C. C. Cheng and A. L. DeVries, Biophys. J. 59 (1991) 409–418, Adsorption of α-helical antifreeze peptides on specific ice crystal surface planes.

A well insulated 5l plastic beaker was filled with deionised water, and placed in a temperature-controlled cabinet at −1° C. It was then allowed to freeze slowly from the top. After two days a single crystal of ice approximately 4 cm thick covered the beaker. The crystallographic orientation of this crystal was determined using single-crystal X-ray diffraction methods. Cubes of ice, of approximately 2 cm dimension, were cut from the large single crystal, such that one surface was parallel to the prism plane, and another parallel to the basal plane. Thus oriented single crystals of ice were produced.

An apparatus are used consisting of a brass cold finger (approx. 1 cm diameter) onto which an oriented seed crystal was frozen. The seed was first hollowed out so that the seed crystal would fit around it. Coolant was then circulated through the finger and the seed became frozen fast to it.

The finger, with the seed crystal, was then dipped into an insulated 100 ml beaker containing a solution of the material under investigation. The initial temperature of the solution was room temperature (−18° C.), and the only cooling was provided by the cold finger Initially the seed crystal partially melted, but it then grew into a single crystal hemisphere. After several hours (6–8) a hemisphere with a diameter of 5–7 cm was formed.

The experiment was carried out with various AFP solutions. The AFP solutions used had a concentration of AFP of $10^{-1}$ mg/ml.

The hemisphere was then removed from the cold finger, and moved to a temperature controlled cabinet at −15° C. The surface was scraped and it was left in the cabinet at least overnight (16 hours or more). Air was circulated through the cabinet by means of an integral fan. During this time evaporation of the surface layers of the ice occurred. The surface of the ice hemisphere thus came to have a smooth mirror surface. However, for a hemisphere containing AFP rough patches are seen on the surface. These correspond to the patches where the AFP has bound onto the surface of the hemisphere. The large AFP molecules prevent the ice molecules from evaporating, and so a rough mat of AFP molecules is built up on the surface at the surfaces where preferential binding to the ice occurs. As the orientation of the hemisphere is known, and the angular distance between these rough patches and the basal and prism directions can be measured by means of an optical goniometer the nature of the binding plane can easily be determined.

This test can be used to select those AFPs which tend to bind to the primary or secondary prism planes. For example AFP type I from Winter flounder or from Alaskan plaice tends to bind to the (20–21) binding site, while AFGPs from Antartic cod ten to bind to the $(10-10)^{3 \text{ or } 5}$ binding site, while AFP III from Antartic eel pout tends to bind to $(10-10)^{2 \text{ or } 5}$ binding site.

It will be well within the ability of the skilled person to use the above test to determine those AFPs which tend to favour the formation of high aspect ratios of ice-crystals For testing their suitability in frozen products of the invention, the actual product can be made and the aspect ratio of the crystals in the product can be determined

EXAMPLE V

Test for determining ice crystal size upon recrystallisation.

A sample of an AFP containing solution in water is adjusted to a sucrose level of 30 wt % (If the starting level of the sample is more than 30% this was done by dilution, if the starting level was lower sucrose was added to the 30% level).

Generally the test can be applied to any suitable composition comprising AFP and water. Generally the level of AFP in such a test composition is not very critical and can for example be from 0.0001 to 0.5 wt %, more preferred 0.0005 to 0.1 wt %, most preferred 0.001 to 0.05 wt %, for example 0.01 wt %

A 3 µL drop of the sample is placed on a 22 mm coverslip. A 16 mm diameter cover-slip is then placed on top and a 200 g weight is placed on the sample to ensure a uniform slide thickness. The edges of the coverslip are sealed with clear nail varnish.

The slide is placed on a Linkham THM 600 temperature Controlled microscope stage. The stage is cooled rapidly (50° C. per minute) to −40° C. to produce a large population of small crystals. The stage temperature is then raised rapidly (50° C. per minute) to −6° C. and held at this temperature.

The ice-phase is observed at −6° C. using a Leica Aristoplan microscope. Polarised light conditions in conjunction with a lambda plate were used to enhance the contrast of the ice-crystals. The state of the ice phase (size of ice-crystals) is recorded by 35 mm photomicrography at T=0 and T=1 hour. Whereby an average particle size (visual determination, number average) of below 20 µm, more prefered between 5 and 15 µm indicates preferred AFPs for use in products according to the invention.

What is claimed is:

1. A brittle frozen confectionery product comprising from 0.0001 to 0.5 wt % of antifreeze peptides, said product having an ice crystal aspect ratio of more than 1.9 wherein the antifreeze peptide is fish AFP Type III.

2. A frozen confectionery product according to claim 1, wherein the aspect ratio is from 1.9 to 3.0.

3. The frozen confectionery product according to claim 1 wherein the AFP type III is type III HPLC-12.

4. A frozen confectionery product comprising discrete elements of brittle frozen confectionery product which provide texture contrast to the frozen confectionery product, wherein the discrete elements comprise from 0.0001 to 0.5 wt % of antifreeze protein and the ice crystals in the discrete elements have an aspect ratio more than 1.9.

5. The frozen confectionery product according to claim 4 wherein the discrete elements alternate with ice cream layers which do not contain antifreeze proteins.

6. The frozen confectionery product according to claim 5 wherein the discrete elements are water ice layers.

7. The frozen confectionery product according to claim 4 wherein the discrete elements are inclusions.

8. The frozen confectionery product according to claim 4 wherein the discrete elements coat a core of ice cream that does not contain antifreeze proteins.

9. The frozen confectionery product according to claim 4 wherein the discrete elements comprise from 0.1 to 50 ppm antifreeze protein.

10. The frozen confectionery product according to claim 4 wherein the antifreeze protein binds to the prism plane of ice crystals.

11. The frozen confectionery product according to claim 4 wherein the antifreeze protein is fish AFP type III HPLC-12.

12. The frozen confectionery product according to claim 4 wherein the antifreeze protein is a fish type III AFP.

* * * * *